United States Patent
Hirayama et al.

(10) Patent No.: US 7,974,884 B2
(45) Date of Patent: Jul. 5, 2011

(54) NETWORK ORDER SYSTEM AND NETWORK SERVER

(75) Inventors: Wataru Hirayama, Tokyo (JP); Maki Kurose, Chiba (JP); Kyouko Shiromizu, Kanagawa (JP); Kenji Hori, Tokyo (JP); Takeshi Dosaka, Tokyo (JP); Osamu Mito, Kanagawa (JP); Karin Kon, Kanagawa (JP); Takeshi Teraoka, Chiba (JP); Takuya Shimomura, Tokyo (JP); Yoshiji Endo, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 565 days.

(21) Appl. No.: 11/752,002

(22) Filed: May 22, 2007

(65) Prior Publication Data

US 2007/0282701 A1 Dec. 6, 2007

(30) Foreign Application Priority Data

May 23, 2006 (JP) ................................ 2006-142757

(51) Int. Cl.
*G06Q 30/00* (2006.01)
(52) U.S. Cl. .................... 705/26.1; 705/26.5; 705/26.81; 705/27.1; 705/27.2
(58) Field of Classification Search .................... 705/26, 705/27
See application file for complete search history.

(56) References Cited

U.S. PATENT DOCUMENTS

| | | | | |
|---|---|---|---|---|
| 6,133,985 | A * | 10/2000 | Garfinkle et al. | 355/40 |
| 6,198,526 | B1 * | 3/2001 | Ohtsuka | 355/40 |
| 6,556,975 | B1 * | 4/2003 | Wittsche | 705/14.73 |
| 6,727,973 | B2 * | 4/2004 | Mizumo | 355/40 |
| 6,806,974 | B1 * | 10/2004 | Ueda et al. | 358/1.13 |
| 7,050,994 | B1 * | 5/2006 | McIntyre et al. | 705/26.41 |
| 7,461,331 | B2 * | 12/2008 | Morris | 715/205 |
| 7,639,380 | B2 * | 12/2009 | Takemoto | 358/1.15 |
| 2003/0187673 | A1 | 10/2003 | Needham et al. | |
| 2004/0260625 | A1 | 12/2004 | Usami et al. | |
| 2004/0267637 | A1 | 12/2004 | Sato et al. | |
| 2005/0278230 | A1 | 12/2005 | Shirasaka et al. | |
| 2009/0112875 | A1 * | 4/2009 | Maes | 707/10 |

FOREIGN PATENT DOCUMENTS

| | | |
|---|---|---|
| EP | 1 298 569 A2 | 4/2003 |
| EP | 1 310 894 A1 | 5/2003 |
| EP | 1 603 063 A1 | 12/2005 |
| JP | 2004-133874 A | 4/2004 |

OTHER PUBLICATIONS

Get photo finish for pittance online Web labs develop business; Jefferson Grahm—USA Today Mclean VA Nov. 21, 2000.*
European Search Report dated Jul. 20, 2007, English.

* cited by examiner

*Primary Examiner* — Matthew S Gart
*Assistant Examiner* — Courtney Stopp
(74) *Attorney, Agent, or Firm* — Sughrue Mion, PLLC

(57) ABSTRACT

The network server stores the order information and the customer information received from the order entry channel in a database with identification information of the retailer system that has mediated the order, extracts, in response to a request from the retailer system, at least one of the order information, the customer information corresponding to the identification information of the retailer system having made the request, and information obtained based on at least one of the order information and the customer information from the database, and provides to the retailer system. The network order system includes the network server for receiving and managing at least the order information.

17 Claims, 9 Drawing Sheets

FIG.6

ALL-RECEIVED ORDER LIST

| ORDER CODE | RETAILER MANAGEMENT ORDER CODE | MEMBER TYPE | MEMBER ID | RETAILER ID | LAB ID | ORDER SPECIFI-CATION |
|---|---|---|---|---|---|---|
| 001 | AY1 | RETAILER | — | RD12 | LD10 | ... |
| 002 | AY2 | RETAILER | — | RD12 | LD10 | ... |
| 003 | ... | RETAILER | — | RF12 | LF12 | ... |
| 004 | ... | CENTER | F135 | RF02 | LF12 | ... |
| 005 | ... | CENTER | F024 | RF02 | LF12 | ... |
| 006 | ... | RETAILER | — | RF12 | LF13 | ... |
| 007 | X1 | CENTER | C123 | RC02 | LC24 | ... |
| 008 | X2 | CENTER | C234 | RC02 | LC24 | ... |
| 009 | ... | CENTER | C888 | RC05 | LC25 | ... |
| 010 | AY3 | RETAILER | — | RD12 | LD10 | ... |
| 011 | X3 | CENTER | C333 | RC02 | LC24 | ... |
| 012 | X4 | CENTER | C333 | RC02 | LC24 | ... |
| ⋮ | ⋮ | ⋮ | ⋮ | ⋮ | ⋮ | ⋮ |

FIG.7

RECEIVED ORDER LIST FROM RETAILER RC02

| ORDER CODE | RETAILER MANAGEMENT ORDER CODE | MEMBER TYPE | MEMBER ID | RETAILER ID | LAB ID | ORDER SPECIFI-CATION |
|---|---|---|---|---|---|---|
| 007 | X1 | CENTER | C123 | RC02 | LC24 | ... |
| 008 | X2 | CENTER | C234 | RC02 | LC24 | ... |
| 011 | X3 | CENTER | C333 | RC02 | LC24 | ... |
| 012 | X4 | CENTER | C333 | RC02 | LC24 | ... |
| ⋮ | ⋮ | ⋮ | ⋮ | ⋮ | ⋮ | ⋮ |

FIG.8

ORDER HISTORY FOR EACH MEMBER OF RETAILER RC02

| MEMBER ID | ORDER HISTORY |
|---|---|
| C123 | ...... |
| C234 | ...... |
| C333 | ...... |
| ⋮ | ⋮ |

FIG.9

RECEIVED ORDER LIST FROM RETAILER RD12

| ORDER CODE | RETAILER MANAGEMENT ORDER CODE | MEMBER TYPE | MEMBER ID | RETAILER ID | LAB ID | ORDER SPECIFICATION |
|---|---|---|---|---|---|---|
| 001 | AY1 | RETAILER | — | RD12 | LD10 | ... |
| 002 | AY2 | RETAILER | — | RD12 | LD10 | ... |
| 010 | AY3 | RETAILER | — | RD12 | LD10 | ... |
| ⋮ | ⋮ | ⋮ | ⋮ | ⋮ | ⋮ | ⋮ |

FIG.10A

MAIN MENU > MEMBER MANAGER MENU > CENTER MEMBER INFORMATION DOWNLOAD    [SIGN OUT]

CENTER MEMBER INFORMATION DOWNLOAD
| PERIOD | From: [    ] [Calendar] To: [    ] [Calendar]
[RETRIEVE]

FIG.10B

RETRIEVAL RESULTS: 11
| PASSWORD | [    ]
[DOWNLOAD]

FIG. 11A

| MAIN MENU > ORDER MANAGER MENU > ORDER INFORMATION RETRIEVAL | SIGN OUT |
|---|---|

ORDER INFORMATION RETRIEVAL

| ORDER NUMBER | [    ] RIGHT TRUNCATION |
| ORDER DATE | From: [    ] [Calendar] To: [    ] [Calendar] |
| ORDER ENTRY CHANNEL | ☑ ORDER Web  ☑ ORDER SOFTWARE  ☑ MS-OPW |
| NAME OF LAB | GERMAN LAB |
| NAME OF RETAILER | |
| LAB MANAGEMENT SHOP CODE | [    ] PERFECT MATCH |
| NAME OF SHOP | [    ] RIGHT TRUNCATION |
| BILLING DESTINATION/ USER ID | [    ] RIGHT TRUNCATION |
| BILLING DESTINATION/ NAME | [    ] RIGHT TRUNCATION |
| BILLING DESTINATION/ PHONE NUMBER | [    ] RIGHT TRUNCATION |
| BILLING DESTINATION/ E-MAIL ADDRESS | [    ] RIGHT TRUNCATION |
| ORDER STATUS | ☑ ORDER RECEIVED  ☑ LAB TRANSFERABLE  ☑ TRANSFERRING TO LAB  ☑ TRANSFERRED TO LAB  ☑ PRINT COMPLETE  ☑ ALL CANCEL  ☑ MEMBER CANCEL |

[RETRIEVE]

FIG. 11B

RETRIEVAL RESULTS: 635
PLEASE CLICK ON DOWNLOAD BUTTON IF WISHING TO ACQUIRE EVERY INFORMATION.
DISPLAYING 1-10 OF 435. <<prev 1 2 3 4 5 next>>
ORDER INFORMATION RETRIEVAL RESULT LIST

| ORDER NUMBER | ORDER DATE | NAME OF RETAILER | BILLING DESTINATION/ NAME | BILLING DESTINATION/ PHONE NUMBER | BILLING DESTINATION/ E-MAIL ADDRESS | ORDER STATUS |
|---|---|---|---|---|---|---|
| 123456780 | 22/04/2005 | Fujifilmnet | mikedevis | 000-0000-0000 | aaa@aaa.com | ORDER RECEIVED |
| 123456781 | 22/04/2005 | Shop Photo | mikedevis | 000-0000-0000 | aaa@aaa.com | ORDER RECEIVED |
| 123456782 | 22/04/2005 | Fujifilmnet | mikedevis | 000-0000-0000 | aaa@aaa.com | ORDER RECEIVED |
| 123456783 | 24/05/2005 | Shop Photo | mikedevis | 000-0000-0000 | aaa@aaa.com | ORDER RECEIVED |
| 123456784 | 22/04/2005 | Fujifilmnet | mikedevis | 000-0000-0000 | aaa@aaa.com | PRINT COMPLETE |
| 123456785 | 01/03/2005 | Shop Photo | mikedevis | 000-0000-0000 | aaa@aaa.com | ORDER RECEIVED |
| 123456786 | 01/03/2005 | Shop Photo | mikedevis | 000-0000-0000 | aaa@aaa.com | PRINT COMPLETE |
| 123456787 | 03/04/2005 | Fujifilmnet | mikedevis | 000-0000-0000 | aaa@aaa.com | ORDER RECEIVED |
| 123456788 | 22/04/2005 | Fujifilmnet | mikedevis | 000-0000-0000 | aaa@aaa.com | ORDER RECEIVED |
| 123456789 | 22/04/2005 | Fujifilmnet | mikedevis | 000-0000-0000 | aaa@aaa.com | ORDER RECEIVED |

<<prev 1 2 3 4 5 next>>

DISPLAYING 1-10 OF 635.
[DOWNLOAD]

NETWORK ORDER SYSTEM AND NETWORK SERVER

The entire content of a document cited in this specification is incorporated herein by reference.

BACKGROUND OF THE INVENTION

The present invention relates to a network order system used to place an order for a photograph print and the like using a communication network such as the Internet, and to a network server constituting the network order system.

As a result of prevalence of a communication network such as the Internet, selling of products, delivery of information for sales promotion, and the like on the Internet have become popular at present.

As a business style using the Internet, there is a business style that provides various services by a certain shop or company uniquely opening a web site (e.g., homepage) which serves as an online shop (window for the shop), and uniquely managing customer information of the web site. In addition, there is also a business style in which operation of a site, management of customer information, and the like are entrusted to a site operator, and a single web site is shared by a plurality of shops.

For example, JP 2004-133874 A discloses a site operation system in which each shop member can send advertisement information input from a cellular phone or the like to customer members of his/her own shop through mails. This system is realized by the plurality of shops (shop members) sharing a web site opened by the site operator and registering information on each shop in a database of the web site, as well as registering information of a customer (customer member), such as a mail address, of each shop in advance and using a mail server of the web site, to thereby send the advertisement information.

As described above, because the site operation and the management of customer information are entrusted to the site operator, each shop does not need to have its own appliances such as a server. Further, customer information of each shop can be registered and managed without any task load of the site operation, and advertisement information can be delivered to own customers.

On the other hand, services on photograph prints using image data and the like obtained by photographing with a digital camera are also provided on the Internet. A plurality of print service providers acquire images photographed with a digital camera by a customer and printing order information using the communication network such as the Internet, and creates a photograph print by reproducing the image according to the order information. After that, the print for which an order has been placed is provided to the customer through delivery service or by sending the print to a designated shop. Thus, a so-called network print service is provided.

Incidentally, in Europe, a number of retailer shop-scale print service providers of a so-called mini lab shop (hereinafter, referred to as "lab") for creating prints is small, and many of the prints are created in large-scale labs (so-called big lab) having high productivity.

Further, in Europe, there exist brokers for mediating between a customer and a lab, called retailers, in most cases.

The retailer entrusts retailer shops such as cosmetic shops and drugstores with installment of a reception window for print orders, and a customer orders a print to the retailer through the reception window. The lab is generally affiliated with a plurality of retailers and creates a print upon reception of a print order of a customer from any of the retailers. Provision of the print created in the lab to the customer is also carried out via the retailer in most cases.

In other words, in the print order/creation/reception system, the lab exists as a background without the customer being aware of its existence. The customer only confronts the retailer to order a print and receive the finished print.

Even in Europe having the business style described above as a mainstream, as a result of prevalence of digital cameras and communication networks, provision of a print order receiving service (network print service described above) using the communication network is being studied. In addition, system development of software among affiliated labs and retailers is being advanced and network print services are starting to be established in countries of Europe.

In the above-mentioned system in which orders made to the plurality of retailers are processed in the large-scale lab and the like, the lab needs to aggregate pieces of order information from all the retailers and information on customers having placed orders for creation of prints in order to create the prints according to the orders and provide the created prints.

Further, as for the retailer, there is conventionally a retailer that uniquely manages customers who have used the own shop, and a retailer that does not perform any particular management. Thus, it is assumed that there will be various demands for customer management for each of the retailers even after shifting to the network print service.

However, a system that can satisfy a request of the lab and various requests of the retailers in managing customer information and order information has not yet been achieved.

For example, as described with reference to JP 2004-133874 A, there is known a method of managing customer information of a plurality of shops in a single web site. However, with the conventional technique of JP 2004-133874 A, the single web site is merely shared by the plurality of shops independent in terms of business, and customer information of each shop is merely held separately in a region of each shop secured in the database of the web site. Therefore, the conventional technique cannot be applied to the style in which orders made to the plurality of retailers are aggregated to be processed.

SUMMARY OF THE INVENTION

To solve the above-mentioned problems of the conventional technique, an object of the present invention is to provide a network order system in which orders placed from a plurality of shops (retailers) are collectively managed and processed by a processing dealer, and a network server constituting the network order system. In the network order system, pieces of information on all orders can be collectively managed, and pieces of customer information with respect to shops entrusted with customer management can also be collectively managed. Further, when requested from a shop, information of an order received by the shop and information on the customer can be provided to the shop. Accordingly, a system in which services to customers can be improved in both the shops (retailers) and the processing dealer can be realized.

To achieve the above-mentioned object, according to an aspect of the present invention, there is provided a network server for receiving and managing order information, or both of the order information and customer information, which is connected via a communication network to plural order entry channels through each of which an order is placed by a customer and each of which send both of the order information and the customer information of the order, and to plural retailer systems each of which mediates the order, wherein the order information received from a order entry channel via a retailer system, or both of the order information and the customer information received are stored in a database with identification information of the retailer system that has mediated the order; and in response to a request from the retailer system, at least one of the order information stored in the database, the customer information corresponding to the identification information of the retailer system having made the request, and information obtained based on at least one of the order information and the customer information is extracted from the database and is provided to the retailer system.

Here, in respect to the request from a retailer system for sending to the network server both of the order information and the customer information sent from the order entry channel, at least one of the order information stored in the database, the customer information corresponding to the identification information of the retailer system having made the request, and the information obtained based on at least one of the order information and the customer information is extracted from the database and is provided to the retailer system, in response to the request from a retailer system for sending to the network server only the order information out of the order information and the customer information sent from the order entry channel and holding the customer information, at least one of the order information stored in the database and the information obtained based on the order information is extracted from the database and is provided to the retailer system.

Further, according to the aspect of the present invention, the information obtained based on at least one of the order information and the customer information is preferably generated based on at least one of the order information and the customer information.

Further, upon request from the retailer system, the information obtained based on at least one of the order information and the customer information is generated, and the generated information is provided to the retailer system.

Alternatively, the information obtained based on at least one of the order information and the customer information is generated in advance, and when requested by the retailer system, the information generated in advance is provided to the retailer system.

Further, it is preferable that the order be an order of a product including at least one of a photograph print based on image data, an album based on the image data, a commodity on which an image of the image data is printed, and a recording medium on which the image data is recorded, and the network server be connected to at least one lab system for creating the product corresponding to the order information.

Alternatively, it is preferable that the network server further include a storage unit for storing uploaded image data of the customer, and the order is an order related to the storing of the image data of the customer in the storage unit.

It should be noted that when requested by the retailer system, at least one of the order information and the customer information corresponding to the identification information of the retailer system may be extracted from the database and the extracted information may be provided to the retailer system.

Further, when requested by the retailer system, an order history of the customer may be generated based on the order information and the customer information, and the generated order history may be provided to the retailer system as the order information or the customer information.

Further, to achieve the above-mentioned object, according to another aspect of the present invention, there is provided a network order system comprising: order entry channels through each of which an order is placed by a customer and each of which sends order information and customer information of the order; retailer systems each of which mediates the order based on the order information and the customer information; a network server for receiving and managing at least the order information and having a database and; and a communication network for connecting the order entry channels, the retailer systems and the network server, wherein the network server is the network server described above, that is to say, the network server stores in the database the order information received from a order entry channel via a retailer system, or the received order information and the received customer information along with identification information of the retailer system that has mediated the order; and in response to a request from the retailer system, the network server extracts from the database at least one of the order information stored in the database, the customer information corresponding to the identification information of the retailer system having made the request, and information obtained based on at least one of the order information and the customer information, and provides the extracted at least one information to the retailer system.

Here, according to the another aspect of the present invention, in the network order system, it is preferable that: the retailer systems include first retailer systems, each sending to the network server both of the order information and the customer information sent from the order entry channel, and a second retailer system for sending to the network server only the order information out of the order information and the customer information sent from the order entry channel and holding the customer information, and in response to a request from the first retailer system, the network server extract from the database at least one of the order information stored in the database, the customer information corresponding to the identification information of the first retailer system having made the request, and information obtained based on at least one of the order information and the customer information, and provide the extracted at least one information to the first retailer system; and in response to a request from the second retailer system, the network server extract from the database at least one of the order information stored in the database and information obtained based on the order information, and provide the extracted at least one information to the second retailer system.

Further, the second retailer system preferably checks conformity between the order information provided from the network server in response to the request and the customer information held in the second retailer system.

Further, the information obtained based on at least one of the order information and the customer information is preferably generated based on at least one of the order information and the customer information.

Further, when requested by the retailer system, the network server preferably generates the information obtained based on at least one of the order information and the customer information, and provides the generated information to the retailer system.

Alternatively, the network server preferably generates the information obtained based on at least one of the order information and the customer information in advance, and provides the information generated in advance to the retailer system when requested by the retailer system.

Further, it is preferable that: the network order system further comprise at least one lab system for creating a product corresponding to the order information and being connected to the network server, and the order entry channel receive an order of the product including at least one of a photograph print based on image data, an album based on the image data, a commodity on which an image of the image data is printed, and a recording medium on which the image data is recorded.

Further, it is preferable that the network server further include a storage unit for storing uploaded image data of the customer, and the order received through the order entry channel be an order related to the storing of the image data of the customer in the storage unit.

Further, the retailer system preferably offers to public via the communication network a web screen as a reception window for an order to be placed through the order entry channel.

It should be noted that when requested by the first retailer system, the network server may extract from the database the order information and the customer information corresponding to the identification information of the first retailer system to provide the extracted order information and the extracted customer information to the first retailer system having made the request. In addition, when requested by the second retailer system, the network server may extract from the database the order information corresponding to the identification information of the second retailer system to provide the extracted order information to the second retailer system having made the request.

According to the present invention, the network server is constructed such that the network server stores and manages order information and customer information sent according to an order from a customer along with identification information of a retailer (agency) that has mediated the order so that the order information and the customer information corresponding to the identification information of the retailer system can be provided when requested by the retailer system. Accordingly, the network server can collectively manage all pieces of order information and the retailer system can obtain the information only when necessary, without spending time and effort in management of customer information. In addition, since the network server extracts and provides, with respect to the retailer system, only the information of the customer of the retailer system, customer management information can be viewed with full security, without the customer information of the retailer system being leaked to another retailer system.

Further, according to an embodiment mode of the present invention, the network server manages the order history for each customer and the retailer can view the order history. Thus, the retailer can readily analyze preferences of a customer even when the retailer is not managing the order information and the customer information, which is effective in improving the service.

In addition, because a customer who has accessed the network server from the web screen of the retailer system performs an ordering operation such as a print order using an order screen provided to the network server, information on order processing such as print order information is stored in the network server instead of the retailer system. Therefore, even in a case where the retailer system uniquely manages customer information, the information on the order processing cannot be managed in the retailer system itself. However, according to the present invention, the retailer system can obtain the information on the order processing from the network server. Thus, analysis of preferences of a user can be performed more accurately by using the information on the order processing with the customer information managed by the retailer system itself.

Further, in a case of applying the present invention to the network print order system, as compared with a conventional system in which a customer (terminal) and an order receiving server are directly connected with each other, even a small-scaled photograph agency (retailer) can participate in a network print service, and the retailer system (retailer managing the retailer system) can readily perform customer management.

BRIEF DESCRIPTION OF THE DRAWINGS

In the accompanying drawings:

FIG. 6 is an example of display of order information;

FIG. 7 is a table obtained by extracting information on a center member (retailer ID=RC02) from the table of FIG. 6;

FIG. 8 is an example of a list of an order history for each member;

FIG. 9 is a table obtained by extracting information on a retailer member (retailer ID=RD12) from the table of FIG. 6;

FIGS. 10A and 10B are examples of a screen layout for requesting download of center member information;

FIG. 11A is an example of a layout of an order information retrieval screen; and FIG. 11B is an example of a display of retrieval results.

DETAILED DESCRIPTION OF THE PREFERRED EMBODIMENT

Hereinafter, a preferred embodiment of a network order system and a network server according to the present invention will be described in detail with reference to the accompanying drawings.

Figure 1:
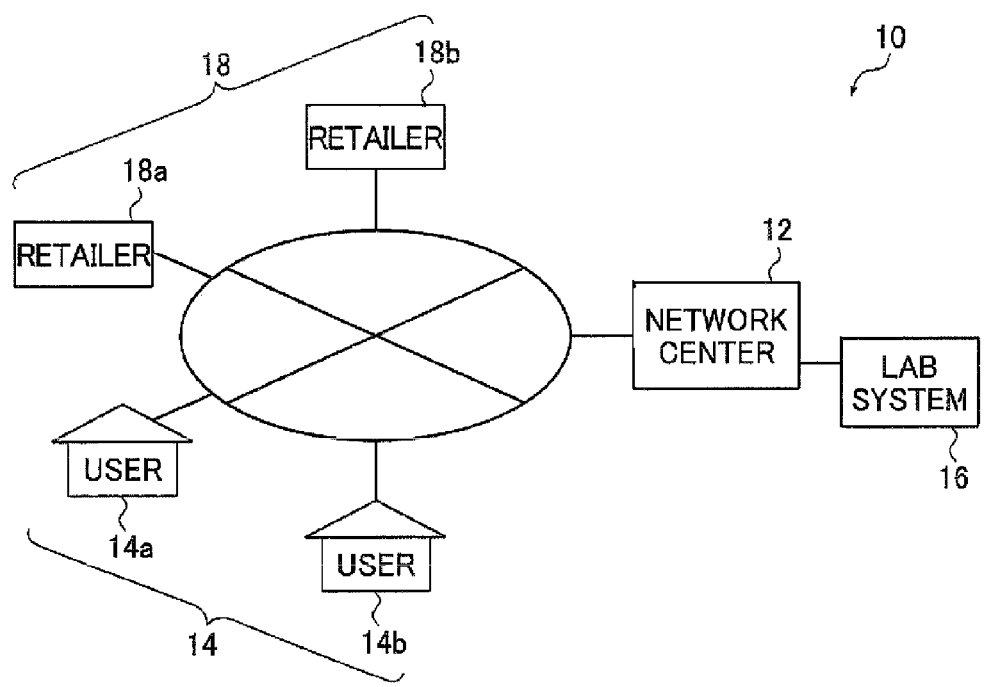
FIG. 1 is a schematic diagram for conceptually showing a configuration of a network order system according to an embodiment of the present invention.

FIG. 1 is a schematic diagram for conceptually showing a configuration of an image network system which is an embodiment mode of the network order system according to the present invention.

An image network system 10 (hereinafter, referred to as "network system 10") shown in FIG. 1 is a system for providing a so-called network print service (online print service) for receiving an order for a (photograph) print from a customer using a communication network such as the Internet, and creating and providing a product according to the order. Further, the network system 10 also provides a so-called electronic album service which enables viewing of an image (image data) transferred from a customer by retaining/managing the image.

The network system 10 as described above basically includes a network center 12 which is a network server of the present invention for controlling/managing the network system 10, an order entry channel 14 (14a and 14b) through which a customer (user of the system) places an order for a print, a lab system 16 owned by a print service provider (hereinafter, referred to as "lab"), and a retailer system 18 (18a and 18b) functioning as a retailer that serves as a mediator between the customer and the lab.

Further, in the network system 10 shown in FIG. 1, the network center 12, the order entry channel 14, and the retailer system 18 are connected to one another via the public communication network such as the Internet. The lab system 16 is connected to the network center 12 via a dedicated communication line. It should be noted that the lab system 16 may be connected via the communication network such as the Internet instead of the dedicated line.

In the network system 10, the retailer system 18 can retrieve customer information (member information) and the like retained in the network center 12. Further, the network center 12 can cause the retailer system 18 to download the customer information (member information) related to the retailer system 18 in response to a request therefrom. Accordingly, to further make security firm, the retailer system 18 and the network center 12 may be accessed using URLs different from that which can be used by general users.

In FIG. 1, for simplifying the figure and clearly showing a configuration of the network system 10, there are shown two order entry channels 14 (14*a* and 14*b*), two retailer systems 18 (18*a* and 18*b*), and one lab system 16. However, the present invention is not limited thereto. Generally, a plurality of order entry channels 14 and a plurality of retailer systems 18 are connected to the communication network, and the lab systems 16 whose number corresponds to an order amount and a type of an order target product from the order entry channels 14 and the retailer systems 18 are provided.

Next, referring to FIG. 2, a description will be given of a configuration and functions of each part of the network system 10, and order processing in the network system 10.

Each of the order entry channels 14 (14*a* and 14*b*) is used to receive a print order from a customer, and is basically realized by using a personal computer (hereinafter, referred to as "PC") that can be connected to the communication network of the customer, a print order terminal installed at a print order receiving shop and connected to the communication network, or the like.

The order entry channel 14 uses a well-known web browser represented by Internet Explorer™ from Microsoft Corporation or Netscape Communicator™ from Netscape Communications Corporation to access (connect to) the network center 12 (web site managed by the network center 12 and made public through the communication network), thereby performing print order processing.

The order entry channel 14 first accesses a web screen (web screen as an access entrance to the network center 12) made public through the communication network (on the web) by the retailer system 18 instead of connecting to the network center 12 from the beginning. After that, the order entry channel 14 accesses the network center 12 (front end 12*b* to be described later) from this web screen.

As the order entry channel 14, in addition to that described above, there may be provided those that use a general-purpose application (software) or a web site, or those that use order software that is a dedicated order application of the network system 10. Examples of the web site include "Online Printing Wizard (OPW)" provided in Windows (registered trademark) XP™ and the like from Microsoft Corporation, "FinePix Viewer" from FUJIFILM Corporation, "PictureIt (PictureIt Express)" from Microsoft Corporation, "Foto Factory" which is an image-related site managed/operated by FUJIFILM Corporation, Germany, and "MSN (Europe)" which is a web site managed/operated by Microsoft Corporation.

Further, a single order entry channel 14 may correspond to one of the web browser, software such as the OPW, and dedicated order software, or may correspond to two or more of those.

A customer who uses the order entry channel 14 belongs to any one of the plurality of retailer systems 18, and is classified as a center member or a retailer member depending on a type of the retailer system 18 to which the member belongs. A member belonging to the retailer system 18*a*, who entrusts management of member information to the network center 12, is a center member (corresponding to the order entry channel 14*a*), and a member belonging to the retailer system 18*b* managing the member information is a retailer member (corresponding to the order entry channel 14*b*).

In the following description, for clarity, the order entry channel 14*a* of the center member is referred to as "center member 14*a*" and the order entry channel 14*b* of the retailer member is referred to as "retailer member 14*b*".

The retailer system 18 serves as a mediator between the customer and the lab and is configured by, for example, a PC, a work station (hereinafter, referred to as "WS"), or a server appliance.

As described above, in a photograph print industry in Europe, there is a broker for mediating between the customer and the lab, called a retailer. A retailer makes a contract with the lab and asks a cosmetic shop, drugstore, and the like to install a reception window for print orders. Upon reception of a print order from a customer, the retailer delivers the received print order to the lab, or when necessary, receives the finished print from the lab and delivers the print to a shop having installed therein a designated reception window or to a home of the customer.

In other words, in this distribution system, the customer feels as if a print is ordered to the retailer and not the lab.

In the network system 10, the retailer system 18 serves as the retailer and is a system (apparatus) owned by the retailer as the above-mentioned broker, for example.

In the present invention, the retailer system is not limited to the retailer as referred to in Europe, that is, a system operated/managed by the broker having a contract with the lab. In the present invention, the retailer is, in terms of appearance, a so-called service subject for providing a service directly to customers, and the retailer system serves as the service subject, that is, serves to execute tasks of the service subject. Specifically, the retailer (service subject) may take any business style as long as the retailer can receive an order for a photograph print from the customer, hand over the finished product to the customer, and accept payment for the product. Specific examples of the retailer (service subject) include a shop dedicated to reception of an order for a photograph print and its delivery or a shop (individual shop) having other subsidiary businesses in addition thereto, and a convenience store. Those mentioned above make a contract with the lab that creates a product such as the photograph print, and carries out tasks of product order reception/product delivery as tasks of the own shop. Further, the lab for creating the product such as the photograph print in the own shop or the so-called mini-lab shop can function as the retailer (service subject) by also performing the tasks of product order reception/product delivery.

As described above, the retailer system 18 is connected to the network center 12 and the order entry channel 14 via the communication network such as the Internet (see FIG. 1). In addition, the retailer system 18 makes public through the communication network (on the web) a web screen through which the order entry channel 14 accesses the network center 12.

For example, the web screen used for access to the network center 12 may be formed by displaying contents (e.g., button for "order print") and the like that link to the network center 12 (web site managed by the network center 12) on a homepage or the like of the retailer. Alternatively, the web screen may be provided as a web screen in a web site of the individual shop, convenience stores, and the lab (order web screen dedicated to the shop).

Alternatively, a web screen dedicated for access to the network center 12 may be provided without using the homepage and the like.

In the network center 10, direct access to the network center 12 (front end 12b to be described later) cannot be made from the order entry channel 14 that uses the web browser. In the case of using the order entry channel 14 using the web browser, the customer accesses the network center 12 from the web screen as in the homepage made public through the communication network by the retailer system 18.

Further, in the case of using the order entry channel 14 using the OPW and the like, the customer basically selects a retailer first to access the network center 12. In addition, in the case of using the order entry channel 14 using the order software, the retailer is uniformly determined, or the retailer is also selected first to access the network center 12.

Therefore, even in the network system 10 of the present invention, the customer can place an order for a print with the feeling of placing an order to the retailer, without being aware of the network center 12 and the lab (lab system 16).

As described above, the retailer system 18 includes a retailer system 18a which entrusts management of member information to the network center 12, and a retailer system 18b for managing the member information. Which of the two types is to be set for each of the retailer systems 18 (whether to manage the member information in the own shop or not) is selected in advance, and the retailer system 18 is registered in the network center 12 with that content. Determination of the type depends on the selection made by an administrator (retailer) of each of the retailer systems 18.

The retailer system 18a that does not manage the member information does not perform authentication or obtain member information when a member registered in the retailer system 18a, that is, a center member 14a accesses the network center 12 to order a print. Thus, order information and member information from the center member 14a are directly sent to the network center 12.

On the other hand, the retailer system 18b that manages the member information includes a function similar to member registration/authentication of the network center 12 to be described later and a member information database 19. The retailer system 18b performs registration of the member (retailer member) belonging thereto, and registers the member information in the member information database 19. Further, when the member belonging to the own system accesses the network center 12, the retailer system 18b performs member authentication in its own system.

In other words, when the retailer member 14b accesses the network center 12 for ordering a print, the retailer system 18b first authenticates the member, and then acquires member information thereof to store the information in the member information database 19. In addition, the retailer system 18b assigns a unique order code with which identification can be made in the own system to the order information to be sent to the network center 12 by the retailer member 14b.

It should be noted that in the network system 10 of the present invention, the retailer system 18 and the lab system 16 to be described later may be constituted as a single system.

The network center 12 controls the network system 10 and is configured by, for example, a PC, a WS, a network appliance, a server appliance, and a storage appliance in combination with one another.

Further, the network center 12 includes a database/file server (DB/FS) 12a for storing/managing images and various pieces of information, such as an image sent from a customer, member information, information on an order for a print or the like, and information for managing and operating the network system 10.

Figure 2:
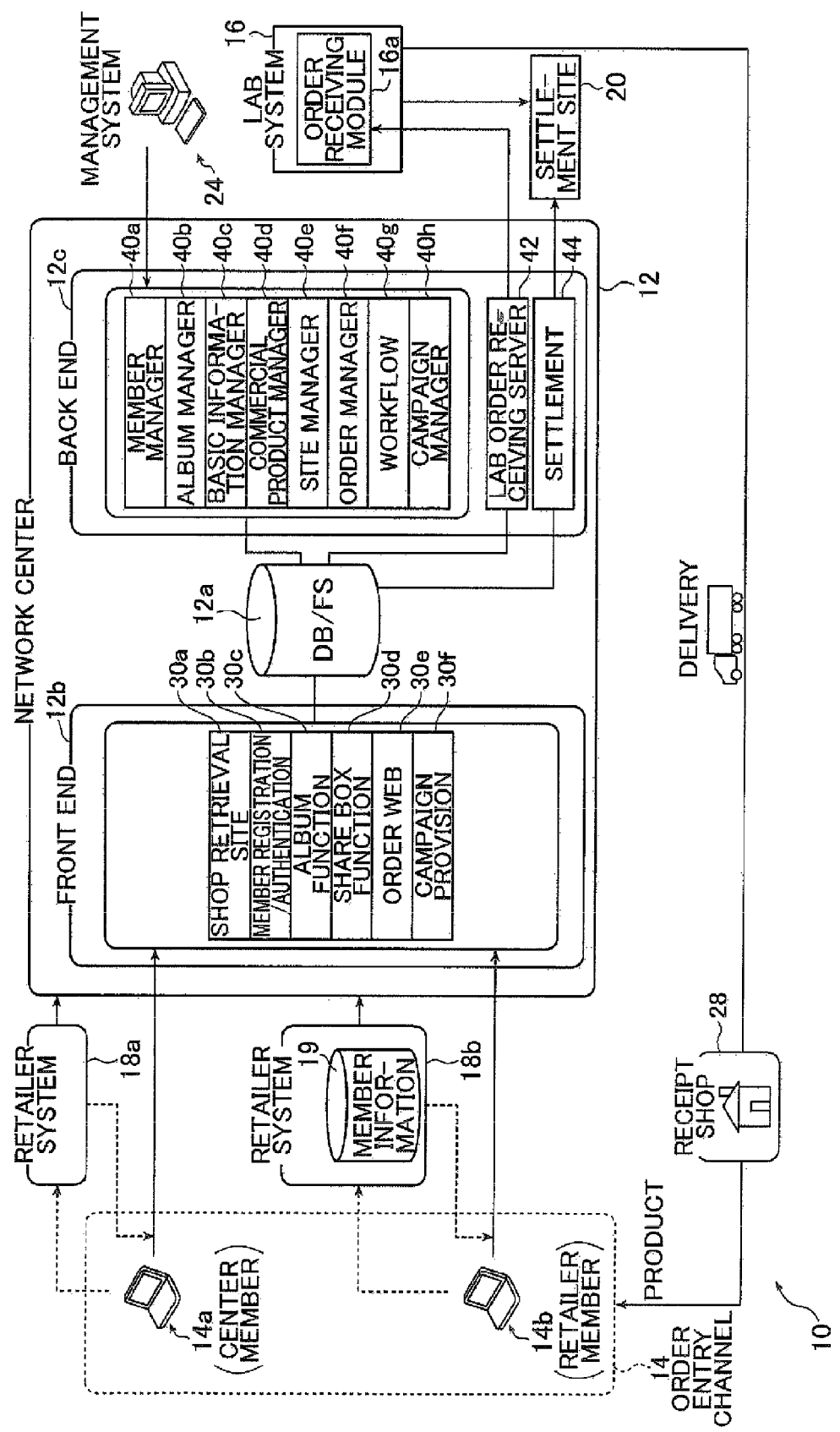
FIG. 2 is a schematic diagram for conceptually illustrating functions of the network system shown in FIG. 1.

As schematically shown in FIG. 2, the network center 12 includes a front end 12b and a back end 12c.

The front end 12b is a site for receiving an order from a customer and the like, and can be accessed from the order entry channel 14. In other words, the front end 12b provides a function as a user interface through which a customer places an order for a print or through which an image is uploaded.

On the other hand, the back end 12c is a site for managing the network system 10 and the network center 12. Therefore, only systems for managing/operating the network system 10, such as a management system 24 for managing the network center 12, the retailer system 18, and the lab system 16 can access the back end 12c, and access cannot be made from the order entry channel 14.

In the network center 12, the front end 12b includes a shop retrieval site block 30a, a member registration/authentication block 30b, an album function block 30c, a share box function block 30d, an order web block 30e, and a campaign provision block 30f. Those blocks provide functions that can be used by the order entry channel 14 using the web browser.

The customer accesses, through the order entry channel 14, the front end 12b of the network center 12 from the web screen as in a homepage made public through the communication network by the retailer system 18, whereby the customer can use the following functions provided by the respective blocks 30a to 30f.

The shop retrieval site block 30a provides a retrieval web site for a customer who has not determined a shop at which a product such as a print is to be received, to retrieve a usable shop. For example, by accessing the shop retrieval site through the order entry channel 14 and designating a country, a list of usable shops in that country and information on each shop are displayed.

The member registration/authentication block 30b provides functions of member registration of a center member, changing of registered member information, member authentication (sign-in), and the like. In the network center 12 shown in FIG. 2, authentication is made by using a member ID (identification information, e.g., identification number) set for each member and a password. The member information is managed by a member manager block 40a of the back end 12b to be described later.

It should be noted that the retailer system 18b also has a function as a member registration/authentication in conformity to that described above. Further, regarding the retailer member (order entry channel of the retailer member) 14b, the retailer system 18b performs member registration, information management and authentication, and the like as described above. Therefore, access from the retailer member 14b is carried out with respect to the network center 12 after authentication is made in the retailer system 18b, and the member authentication is not carried out in the front end 12b.

The album function block 30c provides a function of uploading an image through the order entry channel 14, a function of retaining an image as an album (electronic album) for each member, a function with which the member displays the image of the album on the order entry channel 14 (function with which the member can view his/her own album), and a function of rotating images displayed in the album or displaying them in a slide show. In other words, the album function block 30c provides a function of the electronic album using the communication network.

In the network system 10 shown in FIG. 2, the album provided by the album function block 30c of the network center 12 includes a system album and a My Album. The system album retains an image uploaded by the member. The system album is an album initially and automatically created one for each member at the time of member registration by the network center 12, for example, and all the images uploaded by the member are retained in the system album. On the other hand, the My Album is an album arbitrarily created by the member, for retaining an image selected by the member. The member arbitrarily selects images from the uploaded images and collectively retains the images in the created My Album.

A request (application) of member registration through the order entry channel 14 corresponds to ordering of a service of the system album. Further, creation of the My Album through the order entry channel 14 corresponds to ordering of a service of the My Album. With respect to the order for the album service from the order entry channel 14, the network center 12 stores and manages image data uploaded from the order entry channel 14 by the album function block 30c as the service of the system album or the My Album, thereby providing a service of the electronic album as described above, including displaying and editing an image in various ways based on the stored image data.

It should be noted that the image uploaded through the order entry channel 14 is managed based on image information containing information such as an image code for specifying the image, a member ID, a retailer ID, a file format type, a storage file size, a storage file name, an upload date, and a latest order date. Description on the image information will be given later.

In the network system 10 shown in FIG. 2, the member can perform various album operations and edit the album image by the album function block 30c.

Examples of the album operation include newly creating a My Album, setting/changing a name of the My Album, displaying a list of albums, and deleting the My Album. It should be noted that the system album cannot be deleted by the member.

On the other hand, examples of the album image editing include displaying all images of the album in a slide show, displaying a list of thumbnail images, displaying an enlarged image, displaying a rotated image, adding an image, changing a display order of images, changing a name of the image, copying and moving the image to another album (may select a plurality of albums or select all albums at once), deleting the image (may delete a plurality of images or delete all images at once), and ordering a product such as a print using the image retained in the album.

The share box function block 30d provides a function with which the member presents the image of his/her own album to a third party. With the use of the share box function block 30d, the member can select an arbitrary number of images from the album and create a share box (may be two or more) for presenting the image to the third party. Further, by providing a URL for viewing the image in the share box to acquaintances, the image can be presented to the third party. The share box function is also a part of the album service described above.

The member can perform various share box operations using the share box function.

Specifically, for example, the member can select an image in a single album (may select a plurality of images or select all images at once) to create a share box, present the share box to public (e.g., provision of a URL for viewing the share box by mail transmission), set a password for presenting the share box to public, set a name of the share box, stop presenting the share box to public, display a list of share boxes, display images in the share box in a thumbnail image list, display images in the share box in a slide show, display images in the share box in an enlarged mode, and save/delete a transmission mail address at the time of making the share box public.

Further, the third party can perform various operations on the share box made public, by using the share box function.

Specifically, for example, the third party can display the image in the share box (view the share box), authenticate a password for viewing the share box, display images of the share box in a slide show, display images in the share box in an enlarged mode, and order a product such as a print using the image selected from the share box.

Display of the image retained in the album and the share box is allowed (viewable) for a predetermined period of time. Retention of the image in the album and the share box is also allowed for a predetermined period of time. As will be described later, those periods can be set in the retailer system 18 and the like.

It should be noted that for enabling reception of an order for a print from a member (nonmember) who has not been registered as the member, the front end 12b of the network center 12 preferably includes in addition to the album and the share box a photo storage for providing a function of retaining an image uploaded for order by the nonmember for a predetermined period of time. It should be noted that the image retained in the photo storage can be displayed during an ordering operation, but cannot be displayed after the order has been placed.

The order web block 30e provides a function of receiving an order for a product such as a print, an album, goods (commodity) such as a mug cup or a T-shirt on which an image has been recorded, and a CD recorded with the image.

Access is made to the order web block 30e through the order entry channel 14, and a product (e.g., print, album, goods, and CD), and an image for which a product is to be ordered are selected, and when placing an order for a print, a print size, number of sheets, or the like is input/instructed. In the case of ordering an album, a size of the album, design of the cover, design and a number of sheets of a passe-partout, a size and layout of the image, and the like are input/instructed. Further, if necessary, a receipt destination (receipt shop 28) or a delivery destination of the product, payment method, and the like are input/instructed by the order web block 30e.

In the network system 10 shown in FIG. 2, for order from the member using the order web block 30e, that is, for selection of an image for which a product is to be ordered, there are an album method and a menu method.

The album method is a method in which an image to be ordered is selected from the images retained in the album described above. On the other hand, the menu method is a method in which an image to be ordered is selected from the images uploaded from the order entry channel 14. It should be noted that irrespective of the actual placement of the order, the image uploaded by the member is retained in the system album. In other words, the order web block 30e also provides a function of uploading an image and a function of retaining an image. Alternatively, the order web block 30e may accept upload of images for which a product such as a print may be ordered by the album function block 30c via the order web block 30e, and retain those images in the system album.

Further, in the network system 10, an image can be selected from the images retained in the share box through the order entry channel 14, and a product can be ordered for the selected image. However, as described above, the image of the share box is displayed under a precondition that the URL is provided as described above. Thus, ordering of the image is also carried out with the precondition of URL provision.

The campaign provision block 30f has a function of providing customers with various campaigns conducted by the retailer or the lab described above. The term "campaign" generally refers to a specific service to be provided to a customer in exchange for an order. The specific service includes a discount on an order fee or various goods which are given to the customer.

The campaign provision announces campaign information, for example, on a homepage posted on the communication network by the retailer system 18, or displays the campaign information on the order entry channel 14 when accessed by the order entry channel 14 which uses order software, to thereby notify a customer of the campaign information.

The campaign provision can be applied/set for each retailer (retailer system 18) or for each lab (lab system 16) by a campaign manager 40h of the back end 12c which is described later.

When the order entry channel 14 is provided as the order entry channel 14 which uses OPW, the front end 12b of the network center 12 is provided with a block which provides various functions necessary for receiving an order from the order entry channel 14. When the order entry channel 14 is provided as the order entry channel 14 which uses order software, the front end 12b of the network center 12 is provided with a block which provides various functions necessary for receiving an order placed through order software 14c.

Meanwhile, the back end 12c of the network center 12 is a site for managing the network system 10 and the network center 12 as described above. The back end 12c of the network center 12 includes a member manager block 40a, an album manager block 40b, a basic information manager block 40c, a commercial product manager block 40d, a site manager block 40e, an order manager block 40f, a workflow block 40g, a campaign manager block 40h, a lab order receiving server 42, and a settlement block 44.

The member manager block 40a provides a function of managing member information, such as a function of managing member information of a center member (including a function of managing registration of a new member, changing/adding/updating various kinds of information), a function of retrieving member information, and a function of downloading member information.

The member information of a center member includes, for example, a member ID, a password, an E-mail address, an ID of a receipt shop 28 for receiving a commercial product (selected shop ID), a name, an address, a phone number, and an address for delivery. In addition to those items of information, the member information of a center member further includes a retailer ID indicating a retailer to which the member belongs such as a retailer (retailer system 18) through which the member has registered for membership.

As described above, the member information of a retailer member is managed by the retailer system 18. At the same time, the member manager block 40a of the network center 12 also manages a member ID (member ID assigned by the network center 12), a retailer ID of a retailer registered as a member, and a member ID or an order code (retailer unique ID) assigned for each member by the retailer, in such a manner that the member ID, the retailer ID, and the order code (retailer unique ID) are associated with one another.

Member information of a center member, a member ID of a retailer member, or the like is stored in a database/file server (DB/FS) 12a by the member manager block 40a.

The function of retrieving member information refers to a function of retrieving, in the retailer system 18, a center member that corresponds to certain arbitrary conditions. Further, the function of downloading member information refers to a function of downloading, in the retailer system 18, information of a center member which is related to the retailer system 18.

The album manager block 40b provides a function of managing a storage capacity of the album, the share box, or the photo storage described above and a retaining period or a display period of images retained therein.

The album manager block 40b sets, in response to a request from the retailer system 18 or the lab system 16, a capacity of an album, a retaining period of images, and a display period of images per member, for each retailer system 18 or each lab system 16. That is, the retailer system 18 or the lab system 16 (i.e., a retailer or a lab) is allowed to set the capacity of an album, an image display period, and an image retaining period. The display period and the retaining period may be the same as or different from each other.

Also, the album manager block 40b ends the display of an image expiring the display period, deletes an image expiring the retaining period, and notifies a member by issuing a warning or the like about an album or the like in which the capacity thereof has been exceeded. Further, the album manager block 40b may give notice to a member by E-mail or the like regarding the expiration of the display period.

The above-mentioned information managed by the album manager block 40b, that is, management information on a storage capacity, an image retaining period, a display period, or the like corresponds to order information with respect to the album service. The album management information is related to a member ID of a member who owns the album or the like, and stored in the database/file server (DB/FS) 12a.

The album manager block 40b periodically deletes a My Album, a photo storage, or a share box, which retains no image. Further, the album manager block 40b forcefully suspends publication of a share box which retains an image offensive to public order and morals.

The basic information manager block 40c provides a function of managing basic information of the lab system 16, the retailer system 18, and a receipt shop 28.

The basic information manager block 40c registers/manages a retailer systems 18 (a retailer having the retailer system 18) which are in affiliation with each lab system 16 (a lab having the lab system 16) and receipt shops 28 which are in affiliation with each retailer system 18, in such a manner that the retailer systems 18 and the receipt shops 28 are related to one another. At the same time, the basic information manager block 40c manages basic information of each lab system 16, each retailer system 18, and each receipt shop 28, and changes/updates the basic information as required or needed.

The information of the lab system 16 includes, for example, an ID of the lab (lab ID), a designation, a phone number, a country where the lab is located, a country to which the service is rendered, and a password (lab authentication code) necessary for the lab system 16 to access the network center 12.

The information of the retailer system 18 includes, for example, an ID of the retailer, a designation, an abbreviated name, a country where the retailer is located, a country to which the service is rendered, a supported language, an ID of a lab which the retailer is in affiliation with (affiliated lab ID).

The information of the receipt shop 28 includes, for example, an ID of the shop, a designation, a phone number, a country where the shop is located, a postal code, an ID of a retailer which the receipt shop 28 is in affiliation with (affiliated retailer ID), an ID of a lab to which the affiliated retailer belongs (affiliated lab ID), a management code uniquely assigned to the receipt shop 28 by the lab (shop code for lab management), and a management code uniquely assigned to the receipt shop 28 by the retailer (shop code for retailer management). In this case, the retailer may also serve as the receipt shop 28.

The commercial product manager block 40*d* provides a function of managing a commercial product handled by a lab having the lab system 16, by a retailer having the retailer system 18, and by a receipt shop 28.

In the network system 10 illustrated in the drawing, for example, a (photo) print or an album in which an image received by a customer (member) is reproduced, a CD storing the image, and goods such as a mug and T-shirt in which the image is reproduced are provided to a customer. The commercial product manager block 40*d* provides a function of setting a commercial product (commercial material) handled by each retailer system 18 or each lab system 16, setting the price of the commercial product, and displaying the commercial product on the above-mentioned order web block 30*e* or the like. The commercial product manager block 40*d* also provides a function of creating order setting information relating to an order in accordance with an order for a commercial product (order input instruction) placed by a customer through the order entry channel 14. The order setting information includes, for example, a type of an image or of a commercial product, a print size, or the number of prints.

Commercial products to be handled and the prices thereof may be applied/set, by the function of the commercial product manager block 40*d*, for each retailer system 18 or each lab system 16. That is, a retailer or a lab is allowed to set commercial products to be handled and the prices thereof.

The site manager block 40*e* provides various management functions for operating the network system 10. The various management functions include a function of managing information to be notified to a customer, statistical information, and information on a downloaded application. Specifically, in the network system 10, with respect to each of the retailer system 18, the lab system 16, and the network center 12, various management functions for an administrator administrating each system are set in order to operate and manage the network system 10, and the site manager block 40*e* provides those management functions.

The operation management by a center administrator (operator) managing the network center 12 is conducted by using, for example, a management system (management web) 24 for network center operation management, the management system 24 being connected to the network center 12 via the communication network. The center administrator makes contact with a lab service operator.

The order manager block 40*f* provides a management function relating to an order, that is, a function of creating, retrieving, and displaying order information.

As described above, in response to an order placed by a customer, the commercial product manager block 40*d* creates order setting information. When the order placed by a customer has been fixed and the customer has selected a receiving method of the commercial product and a method of payment to thereby complete the order (order establishment), the order manager block 40*f* creates predetermined information by performing necessary calculation, such as fee calculation, based on, for example, the order setting information, to thereby create order information. In the case where the method of payment includes credit-card payment or debit-card payment (payment by cash card), a result of authorization (credit authorization) conducted by the settlement block 44 described later is also added to the order information.

The order information thus created is transmitted to the lab order receiving server 42 to be stored therein.

The order manager block 40*f* stores the created order information in the database/file server (DB/FS) 12*a* and manages the information. The order information accumulated in the DB/FS 12*a* in the form of a database can be retrieved or displayed by the lab system 16 or further by the retailer system 18.

The order manager block 40*f* can retrieve, in response to a request from the retailer system 18, only the order information of the customer of the retailer system 18 from among the order information stored in the order manager block 40*f*. Also, the order manager block 40*f* causes the retailer system 18 to download the order information thus retrieved and extracted.

In the case where a customer of the retailer system 18 is a center member and the member manager block 40*a* of the network center 12 manages the member information, the member information corresponding to the order information thus extracted can also be provided to the retailer system 18.

In the network system 10, three items of information including "order", "order statement", and "order statement image", which are related to one another, constitute the order information.

The "order" includes an order code for specifying the order (order information), time of order, a terminal ID indicating an ID of the order entry channel 14 (including a print order terminal dedicated to a print order, the print order terminal being operated by a customer), a retailer ID, a member ID, a lab ID, information on a fee (including a basic fee and a delivery fee), information on a receiving method, a receipt shop ID, information on a delivery destination and a delivery of the commercial product, and information on a method of payment.

The "order statement" includes information such as an order statement code specifying the order statement, a commercial product type, a commercial product ID, a commercial product designation, a total price on order, and a type of a price structure (information on price setting set for each lab and retailer).

Further, the "order statement image" includes information such as an image code and an order quantity.

In the example shown in the drawing, image information of the ordered image and the order information are related to one another based on the image code included in the "order statement image".

The image information includes information such as an image code specifying the image, a member ID, a retailer ID, a file format type, a stored-file size, a stored-file name, an upload date, and a latest order date.

The workflow block 40*g* provides a workflow function with respect to a change in settings of price and commercial product in conducting operational management of the network system 10.

When the retailer system 18 or the lab system 16 has made an application to make changes in information of the retailer or the lab, such as to make a change to basic information and detailed information, to make a change to a fee, to make a change to information on a receipt shop 28, to register and update a campaign to conduct, and to make a change to the web screen, the workflow block 40*g* judges whether the application is appropriate or not so as to determine whether to approve or reject. In the case where the application has been approved, the workflow block 40*g* confirms the change thus applied, and applies the content of the change to the network system 10.

The campaign manager block 40*h* provides a function of managing registration/retrieval and suspension of various campaigns, and issuance of coupons.

In the network system 10 illustrated in the drawing, the campaign to offer a fee discount and a complimentary gift is illustrated as an example. The fee discount includes a direct fee discount and issuance of a coupon serving as a unique ID to provide a discount. The campaign can be conducted by selecting the target order entry channel 14. The retailer system 18 or the lab system 16 uses the function of the campaign manager block 40h to arbitrarily set and register a campaign, so as to have the campaign reflected on the campaign provision of the front end 12b.

Further, the retailer system 18 or the lab system 16 uses the campaign manager block 40h to retrieve/display a campaign, to make a change in a campaign yet to be conducted, to suspend a campaign being conducted, to update a campaign, to delete campaign information, to issue coupons, or the like.

The lab order receiving server 42 provides an order reception function in the lab system 16. The order reception function includes a function of transmitting order information and image to the lab system 16 through a lab order receiving module 16a which is described later.

As described above, the order information is transmitted to the lab order receiving server 42, and the image data corresponding to the order information is also transmitted to the lab order receiving server 42 (hereinafter, order information for one order and image data corresponding thereto are collectively referred to as "order job"). The lab order receiving server 42 transfers a list of order information to the lab system 16, in response to a request from the lab system 16, and also transfers to the lab system 16 an order job corresponding to one order requested by the lab system 16.

The settlement block 44 provides a function of obtaining, from a settlement site 20, authorization (credit authorization) of settlement in the case where the method of payment includes credit-card payment or debit-card payment.

The settlement site 20 is a web site, which is connected to the network center 12 via the communication network, for conducting a commonly-known online payment. The network center 12 uses the settlement site merely to obtain authorization.

The lab system 16 is a system installed in a lab (print service provider) which is constituted by a PC, a WS, server equipment, or the like. The system also has a digital photo printer, a photographic printing device for various goods, and the like connected thereto. Alternatively, those devices are integrally formed into a single system.

The lab system 16 is installed with order reception software which is an application for taking in an order for commercial product from the network center 12. The order reception software includes an order receiving module 16a which provides an interface for enabling the lab system 16 to obtain an order job from the network center 12 (lab order receiving server 42).

The lab system 16 obtains the list of order information by using the order receiving module 16a and requests the lab order receiving server 42 to transfer an order job corresponding to the lab system 16, to thereby obtain the order job. The lab (lab system 16) creates a commercial product corresponding to the order job, and delivers the commercial product to a delivery destination or to a receipt shop 28 corresponding to the order information. Also, the lab system 16 determines whether to confirm/cancel the credit-card payment or to cancel the debit-card payment, in accordance with the authorization information which has been added to the order information, and transmits the result thereof to the settlement site 20.

The network system 10 is basically constructed as described above.

Next, a description is given of an order processing flow in the network system 10 when an order is placed by a member (center member and retailer member).

Figure 3:
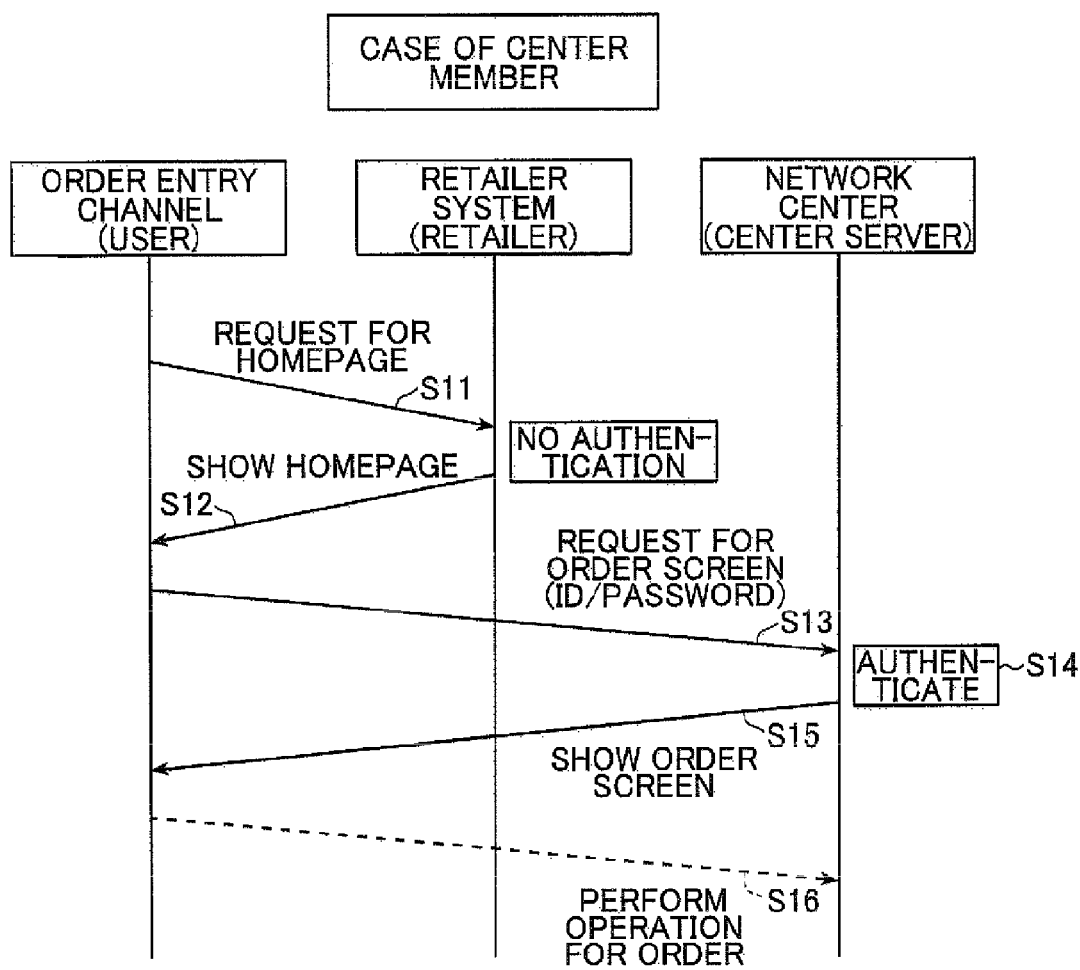
FIG. 3 is a flowchart of order processing from a retailer system to which a center member belongs.

In a case where a center member is to place an order for print or the like, the center member (the order entry channel thereof) 14a first accesses, as shown in FIG. 3, a homepage of a desired retailer, that is, a web screen posted on the communication network by the retailer system 18a to which the center member is registered as a member, in order to use network print order service (Step S11 of FIG. 3, "request for homepage" from the order entry channel to the retailer system).

In response to this, the retailer system 18a shows the homepage to the member without authenticating the member accessing the web site (Step S12, "(show) homepage" by the retailer system to the order entry channel).

The center member 14a clicks on an order button arranged in the homepage of the retailer system 18a, thereby connecting to the web site of the network center 12 (Step S13, "request for order screen" from the order entry channel to the network center).

Figure 5:
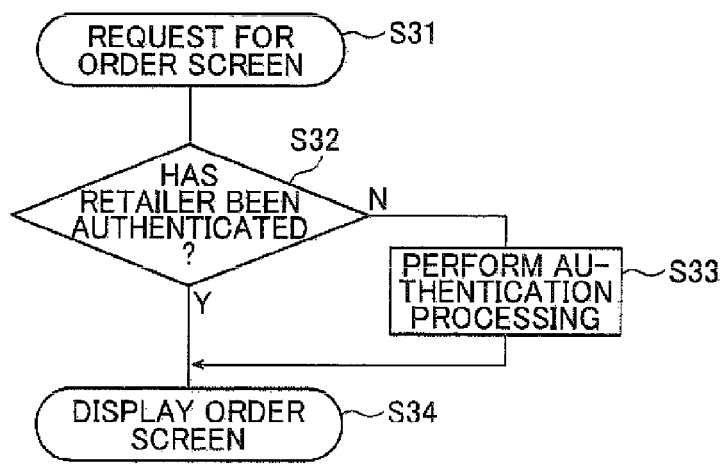
FIG. 5 is a flowchart of processing for judging whether member authentication is to be performed.

Having received the order screen request, the network center 12 proceeds from Step S31 to Step S32, as shown in FIG. 5, where the network center 12 judges whether the order entry channel 14 requesting the order screen, that is, the order entry channel 14 connected thereto, has been authenticated by the retailer system 18 or not (Step S32). When it has been judged that the order entry channel 14 has not been authenticated by the retailer (judged as "No" in Step S32), the network center 12 performs a member authentication process by the function of the member registration/authentication block 30b of the front end 12b (Step S33 of FIG. 5 or Step S14 of FIG. 3). Specifically, the network center 12 requests the center member 14a to input an ID and a password, and compares the ID and the password thus input with the member information managed by the member manager block 40a of the back end 12c.

A user (center member 14a) is accepted by the network center 12 only when the user is authenticated by the member authentication, and an order screen is provided to the user by the order web block 30e of the front end 12b (Step S34 of FIG. 5 or Step S15 of FIG. 3, "(show) order screen" by the network center 12 to the order entry channel).

The center member 14a authenticated as a member by the network center 12 is allowed to selectively use various services provided in the order screen thus displayed. Specifically, the center member 14a can be provided with network print service in which the center member 14a uploads images to a system album through the order web block 30e of the network center 12 and selects an image from among the images uploaded (menu system), or brings up an album including images which have been uploaded previously and selects an arbitrary image from the album (album system), to thereby places an order for goods on which the image thus selected is reproduced (Step S16 of FIG. 3, "operation for order" from the order entry channel to the network center).

As described above, in the case of a retailer system 18a which does not perform member management, the member information and the order information of the center member 14a using the network print service are both managed by the network center 12, and the data thereof is accumulated in the database/file server (DB/FS) 12a and managed by the member manager block 40a of the back end 12c.

Figure 4:
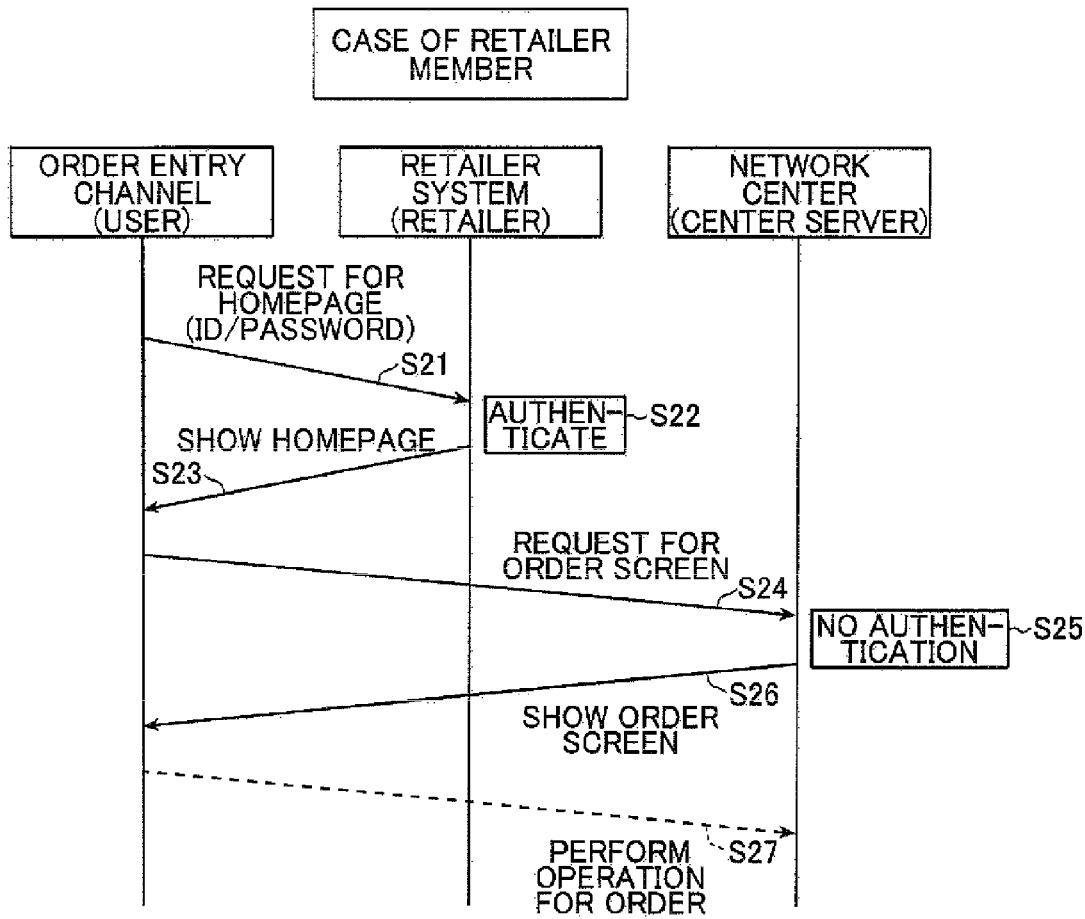
FIG. 4 is a flowchart of order processing from a retailer system to which a retailer member belongs.

Meanwhile, in a case where a retailer member is to place an order for print or the like, the retailer member (the order entry channel thereof) 14b first accesses, as shown in FIG. 4, the retailer system 18b to which the retailer member is registered as a member (Step S21, "request for homepage" from the order entry channel to the retailer system).

The retailer system 18b authenticates the member accessing the system by the member registration/authentication block 30b thereof (Step S22). Specifically, the retailer system 18b requests the center member 14b to input an ID and a password, and compares the ID and the password thus input with the member information registered in the member information database 19. Then, an order screen is provided to a user (retailer member 14b) only when the user is authenticated by the member authentication (Step S23, "(show) homepage" by the retailer system to the order entry channel).

The retailer member 14b clicks on an order button arranged in the homepage of the retailer system 18b, thereby connecting to the web site of the network center 12 (Step S24, "request for order screen" from the order entry channel to the network center 12).

The network center 12 judges, similarly to the above, whether the order entry channel 14 connected thereto is authenticated by the retailer or not. When it has been judged that the order entry channel has been authenticated by the retailer ("Yes" in Step S32 of FIG. 5, Step S25 of FIG. 4), the network center 12 provides an order screen (Step S34 of FIG. 5, Step S26 of FIG. 4, "(show) order screen" by the network center 12 to the order entry channel).

As shown in the following, the retailer member 14b can be provided with network print service, as in the case of the center member 14a (Step S27, "operation for order" from the order entry channel to the network center 12).

In the case of the retailer system 18b which performs member management, the system obtains the member information of the retailer member 14b when authenticating the member and stores the information in the member information database 19 of the retailer system 18b. Further, the retailer system 18b assigns a unique order code to an order operation performed by the retailer member 14b with respect to the network center 12.

Accordingly, the network center 12 does not have the member information of the retailer member 14b, and obtains the order code assigned by the retailer system 18b and the information on an order input through the order screen by relating the order code and the information on an order to each other, and manages the information on an order by the order manager block 40f in the back end 12c of the network center 12. As described above, the order manager block 40f creates order information based on the information on order thus obtained, and the order information thus created is accumulated in the database/file server (DB/FS) 12a.

In the network center 12, the commercial product manager block 40d creates order setting information in accordance with an order placed through the order entry channel 14, and when the order is confirmed, the order manager block 40f creates order information and transmits an order job (order information and image data corresponding thereto) to the lab order receiving server 42.

The lab system 16 views the list of the order information in the lab order receiving server 42 by using the order receiving module 16a, and requests the lab order receiving server 42 to transfer an order job related to the lab system 16. The lab system 16 creates a commercial product such as print corresponding to the order information of the order job thus transferred, and delivers the product.

In the manner as described above, according to the network system 10, as in the case of conventional commercial transaction of print in Europe, a customer can place an order for print or the like in much the same way as if the order is directly placed with a retailer and the product is received from the retailer, without regard to the lab or the network center 12.

Further, the communication network such as the Internet is used, which allows a customer to place an order for a commercial product from anywhere without concern for business hours. Further, it is also possible to provide the customer with public album service which can be made open to a third party or with electronic album service.

Further, information is shared by retailers or labs as much as possible in order that an interface function with respect to a customer and a management function of the network system 10 are aggregated to the network center 12. Therefore, it is possible to streamline delivery and collection service, customer management, and settlement processing as well as simplifying a system operation and reducing an operational cost. In addition, the network center 12 is often capable of centrally dealing with a trouble or version upgrades of the network system 10, to thereby stabilize the operation and speed up troubleshooting.

Next, a description is given of provision of member information by the member manager block 40a of the network center 12 to the retailer system 18.

As described above, the member manager block 40a manages member information of center members. In response to a request from the retailer system 18a with a center member which does not manage member information, the member manager block 40a is capable of providing the member information merely related to the retailer member of the retailer system 18a.

In the case where the retailer system 18a makes an inquiry to the network center 12 about information of a user (member information) using the retailer thereof, for example, in the case where the retailer system 18a issues a retrieval request or download request of the information, the retailer system 18a issues a connection request to (accesses) the member manager block 40a in the back end 12c of the network center 12. The network center 12, in communicating with the retailer system 18a, performs authentication of the retailer system 18a based on the retailer registration information, in response to the connection request from the retailer system 18a, and starts communicating with the retailer system 18a when the retailer system 18a passes the authentication.

The retailer system 18a requests, when the communication is established between the retailer system 18a and the network center 12, member information related to the retailer.

The network center 12 transmits, in response to the member information request from the retailer system 18a, member information database managed by the member manager block 40a. At this time, the network center 12 partially covers the member information database with a mask in the field related to retailers so that only the information related to the customers of the retailer as a requester can be extracted without including the member information related to other retailers.

The retailer system 18a is capable of downloading, in the form of files, the member information which goes through the retailer.

For example, in a screen as shown in FIG. 10A for requesting download of center member information of the network center 12, when the retailer system 18a inputs a target period for retrieval, the member manager block 40a of the network center 12 searches the member information database stored in the DB/FS 12a for data based on a retailer ID of the retailer system 18a thus authenticated and the designated period, and retrieves information of members registered during the designated period. As shown in FIG. 10B, the search result or the number of hits in retrieval may be displayed in the download request screen before receiving the download execution instruction. Also, in order to further ensure protection of personal data, the retailer system 18a may be requested to input a password as shown in FIG. 10B before executing the download.

In the manner as described above, the retailer using the retailer system 18a is capable of obtaining information only related to users using the retailer. In other words, the information related to the users of the retailer does not leak out to other retailers, which makes it possible for the retailer system 18a to obtain necessary information while ensuring the security of information. That is, the network center 12 is capable of ensuring safe management of member information for each retailer.

Next, a description is given of provision of order information by the order manager block 40f of the network center 12 to the retailer system 18.

FIG. 6 shows a display example of order information. In the example of FIG. 6, all the orders received by the network center 12 are listed in chronological order. Items of the list include an order code assigned by the network center 12, an order code for retailer management assigned by the retailer system 18b which performs member management by itself, a member type, a member ID, a retailer ID, a lab ID, and an order statement.

The orders received by the network center 12 include both an order from a center member and an order from a retailer member. Further, information which is sent when an order is placed is different depending on a member type. In the example shown in FIG. 6, information on an order placed by a center member includes member information such as a member ID input by the member, while information on an order placed by a retailer member does not include member information such as a member ID input by the member. Also, in the example shown in FIG. 6, the information on an order placed by a retailer member includes an order code (order code for retailer management) assigned by the retailer such that the retailer can identify an order placed by each retailer member. The information on an order placed by a center member may also include the order code for retailer management.

First, a description is given of a case of the retailer system 18a which does not perform member information management and has a center member.

When the retailer system 18a issues a connection request to (accesses) the order manager block 40f in the back end 12c of the network center 12 in order to make an inquiry to the network center 12 about the order information which has gone through the retailer, the network center 12 performs authentication of the retailer system 18a based on the retailer registration information. When the retailer system 18a passes the authentication, the network center 12 starts communicating with the retailer system 18a.

The retailer system 18a requests information on orders placed by members of the retailer when communication has been established between the network center 12 and the retailer system 18a. In response to the request, the order manager block 40f of the network center 12 retrieves orders each having the retailer ID of the retailer system 18a from the order information database stored in the order manager block 40f to thereby creates a list. Similarly to the case of providing member information as described above, the list is created by partially covering the order information database with a mask in the field related to retailers so that only the order information from retailers as requesters is extracted without including order information of other retailers. FIG. 7 shows a table obtained by extracting data items with a retailer ID of RC02 from the table of FIG. 6.

It is also preferable that the order manager block 40f further edit an order statement for the same member based on an order reception list created with respect to the same retailer, to thereby create a list of order history for each member as shown in FIG. 8.

Also, the tables of FIGS. 7 and 8 each only show a member ID as the member information. However, the network center 12 searches, based on the member ID, the member information database by using the above-mentioned member manager 40a, to thereby create a tabulated list in which information on customers (member information) who have placed orders is related to the member ID.

In the manner as described above, the retailer system 18a can download, from the network center 12, information corresponding to FIG. 7 or FIG. 8 as information on orders placed from the retailer and customer information.

Also, the retailer system 18a can retrieve necessary information from information on orders placed by the retailer. For example, in the order information search screen of the network center 12 as shown in FIG. 11A, the retailer system 18a selectively inputs, as a retrieval key, arbitrary items from among an order number, an order date, a member ID, a member name, a billing phone number and the like, in order to request retrieval execution. Further, an order status (such as "order reception", "lab transfer", "print completion", or "cancel") may be designated as the retrieval key. The order manager block 40f of the network center 12 executes a search of the order information of members belonging to the retailer system 18a by using the designated retrieval key, and displays the search result on the order information search screen. FIG. 11B shows a display example of the search result. The retailer system 18a can narrow the search to the desired information as described above, to thereby download the desired information from the network center 12.

Therefore, a retailer of the retailer system 18a can obtain information on a customer of the retailer or information on the order placed by the customer when necessary, without taking time and labor for customer information management. Based on the information thus obtained, the retailer can be aware of user's preference or the like. By use of the information, it is possible to improve service and launch appropriate advertisement to a user of the retailer. The information can also be used to find a new customer.

Next, a description is given of a case of a retailer system 18b which conducts member information management and has a retailer member.

Similarly to the above, in the case of the retailer system 18b, the retailer system 18b is authenticated by the network center 12 before the communication is started therebetween. Once the communication has started, the retailer system 18b requests information on orders placed from the retailer thereof. For example, with respect to the request from the retailer system 18b with a retailer ID of RD12, the order manager block 40f of the network center 12 partially covers the order information database with a mask in the field of a retailer ID=RD12, to thereby extract the order information solely related to the retailer. Accordingly, a list as shown in FIG. 9 can be obtained.

The retailer system 18b can download information corresponding to FIG. 9 from the network center 12.

In this case, the order information from a retailer member (retailer system 18b) does not include member information attached thereto, and therefore the list of information, which corresponds to the order information, can be obtained merely by unit of order. Each piece of order information extracted is identifiable based on an order code or an order code for retailer management.

Also, the retailer system 18b manages the member information of the customers of the retailer. Accordingly, the retailer system 18b is capable of comparing the order information downloaded from the network center 12 with the member information managed by the retailer and checks conformity between those items of information, to thereby create an order history for each customer. In this way, the retailer having the retailer system 18b can more accurately grasp user's preference or the like. By use of the information, it is possible to improve service and launch appropriate advertisement to a user of the retailer itself. The information can also be used to find a new customer.

The network center 12 can provide the retailer system 18 with not only the member information itself of a center member belonging to the retailer system 18 and the order information itself of a center member and a retailer member but also information obtained by processing and editing those items of information, that is, information obtained based on those items of information.

Examples of items of information, which are provided to the retailer system 18a having a center member and the retailer system 18b having a retailer member, obtained by processing the order information related to the retailer system 18a or the retailer system 18b include compiled data obtained by counting the total number of orders, image retaining capacity distribution data, a top 10 list of image retaining capacity, and compiled data obtained by counting the number of uses of campaigns, in the retailer system 18a or the retailer system 18b.

Meanwhile, examples of items of information, which are provided to the retailer system 18a having a center member, obtained by processing the member information related to the retailer system 18a include compiled data of the number of members (the number of customers) and statistical data such as a list of members or the like on the top 10 list of image retaining capacity.

Examples of items of information, which are provided to the retailer system 18a having a center member, obtained by processing the order information and the member information related to the retailer system 18a include a list of order histories of respective members as shown in FIG. 8, compiled data of order information for each member, statistical data on an age distribution and a region distribution of members for respective order items in the retailer system 18a, and order items and order quantity for respective generations or regions of members.

Further, the network center 12 can provide the retailer system 18 with statistical information obtained based on one or both of the order information and the member information managed by the network center 12.

Examples of information obtained based on the order information include compiled data on order information of all the customers, compiled data on the total number of orders, and compiled data on the number of uses of campaigns, in the network center 12.

Examples of information obtained based on the member information include compiled data of the total number of members (the number of customers) which also includes, if known, the number of center members and the retailer members managed by the network center 12 through the member manager block 40a, image retaining capacity distribution data of all the members managed by the album manager block 40b, and statistical data for respective generations and regions of members on the top 10 list of image retaining capacity.

Examples of information obtained based on the order information and the member information include statistical data on an age distribution and a region distribution of all the center members for respective order items and on order item and order quantity for respective generations and respective regions of all the center members.

The above-mentioned statistical information can be retrieved through the information search screen of the network center 12 and displayed. It is also possible to request the download of the statistical information. For example, the retailer system 18 selects information to obtain by choosing an item from the pull-down menu or the list menu in the information search screen of the network center 12, and inputs a target period with respect to the statistical information so as to request the execution of a search. The order manager block 40f of the network center 12 creates statistical information thus designated by processing the order information and the member information stored in the DB/FS 12a to be managed, and displays the information thus created on the information search screen. Alternatively, the order manager block 40f receives a request to download the information thus created.

The above-mentioned various items of data may be processed or edited each time the retailer system 18 requests, or processed or edited in advance regarding the item of information which may possibly be requested.

For example, items of information which are to be used in response to an inquiry from a member (user) or in an error investigation on order reception may preferably be searched based on detailed conditions in order to extract more specific information. Accordingly, it is suitable to subject the item of information to data processing upon request or inquiry from the retailer system 18. In addition, in the case where the data processing is not so heavy (not so high in processing load) that it is not necessary to perform the data processing in advance, it is suitable to subject the item of information to the data processing upon request or inquiry from the retailer system 18, rather than further storing the processed data.

Of the above-mentioned items of data, the member information itself related to the retailer system 18 making the request or the order information itself may be subjected to a data extraction when requested by the retailer system 18. As the retrieval key for the data extraction, an order data, a customer name, a customer phone number, an order entry channel ID, or the like may be used.

It is also possible to extract the member information or the order information in advance based on the retailer ID of a retailer system 18 and store the information in the DB/FS 12a. When requested by the retailer system 18, the member information or the order information of the corresponding retailer ID may be read out from the DB/FS 12a to be provided.

On the other hand, data which is necessary to be extracted in large quantity in a necessary form and processed by the network center 12 may preferably be subjected to data processing in advance on the assumption that an inquiry may possibly be made with respect to the data. If the data in large quantity is processed after requested by the retailer system 18, the system load is increased, which may affect other processing. The data may be extracted and processed during a time period which the system can afford to spare, to thereby prevent deterioration in system performance. As regards data items which are accumulated daily, new items of data for each day may preferably be subjected to data processing at a predetermined timing, for example, at a fixed time or at a fixed day.

Of the above-mentioned items of data, statistical information such as the compiled data on the total number of customers, the image retaining capacity distribution data, data on members on the top 10 list of image retaining capacity, order information for each customer, and the compiled data on the number of uses of campaigns may preferably be subjected to data processing in advance or periodically on the assumption that a request may possibly be made by the retailer system 18 with respect to the data. Those items of information can be obtained by extracting and processing one or both of the order information and the member information for a defined period, for each member, or for each order.

The information thus processed and obtained may be stored in the DB/FS 12*a*, and when requested by the retailer system 18, the information corresponding to the request may be read out from the DB/FS 12*a* to be provided to the retailer system 18.

The order information created by the order manager block 40*f* may be used by the lab system 16. In this case, the lab system 16, after being authenticated by the network center 12, can obtain the compiled information on orders placed by one or a plurality of retailer systems 18 engaged with the lab system 16. Further, the lab system 16 can also use the statistical information created by the order manager block 40*f*. The lab system 16 can use those items of information in production planning etc. and also in trying to improve service and production efficiency.

As described above, the retailer system 18 and the lab system 16 may obtain the order information and the member information or the statistical information based thereon to make an analysis on the information, and send the result of analysis to the network center 12. For example, the retailer system 18 or the lab system 16 makes an analysis on the order information obtained from the network center 12 to figure out a hot-selling commercial product, and transmits the result of the analysis to the network center 12. The network center 12 can set a price of the product on which the result of analysis transmitted from the retailer system 18 or the lab system 16 is reflected.

Further, the retailer system 18 or the lab system 16, for example, makes an analysis on the album quantity possessed by each customer, and transmits the result of analysis to the network center 12. The network center 12 can use the result of analysis as the reference value for changing the upper limit of the retaining capacity of an album.

Hereinabove, a detailed description has been given of the network order system and the network server according to the present invention. The present invention, however, is not limited to the above-mentioned embodiment, and it is of course possible to make various improvements and modifications thereto without departing from the gist of the present invention.

What is claimed is:

1. A network server configured to receive and manage information comprising either order information or order information and customer information, the network server being connected via a communication network to plural order entry channels and to plural retailer member systems, wherein an order entry channel sends to a retailer member system the information associated with an order placed by a customer through the order entry channel, the retailer member system mediates the order received from the order entry channel and sends the order to the network server, wherein the information received at the network server from the order entry channel via the retailer member system, is stored in a database at the network server with identification information of the retailer member system that has mediated the order; and based on the identification information of the retailer member system and in response to a request from the retailer member system, at least one of the order information corresponding to the identification information of the retailer member system, the customer information corresponding to the identification information of the retailer member system, or additional information corresponding to the identification information of the retailer member system and generated based on at least one of the order information and the customer information is extracted from the database and is provided to the retailer member system.

2. The network server according to claim 1, wherein, in response to the request from a retailer member system for sending to the network server both of the order information and the customer information sent from the order entry channel, at least one of the order information stored in the database, the customer information corresponding to the identification information of the retailer member system having made the request, and the information obtained based on at least one of the order information and the customer information is extracted from the database and is provided to the retailer member system, in response to the request from a retailer member system for sending to the network server only the order information out of the order information and the customer information sent from the order entry channel and holding the customer information, at least one of the order information stored in the database and the information obtained based on the order information is extracted from the database and is provided to the retailer member system.

3. The network server according to claim 1, wherein, when requested by the retailer member system, the network server generates the information obtained based on at least one of the order information and the customer information, and the generated information is provided to the retailer member system.

4. The network server according to claim 1, wherein the information obtained based on at least one of the order information and the customer information is generated in advance, and when requested by the retailer member system, the information generated in advance is provided to the retailer member system.

5. The network server according to claim 1, wherein the order is an order of a product including at least one of a photograph print based on image data, an album based on the image data, a commodity on which an image of the image data is printed, and a recording medium on which the image data is recorded, and the network server is connected to at least one lab system for creating the product corresponding to the order information.

6. The network server according to claim 1, wherein the network server further includes a storage unit for storing uploaded image data of the customer, and the order is an order related to the storing of the image data of the customer in the storage unit.

7. The network server according to claim 1, wherein, when requested by the retailer member system, at least one of the order information and the customer information corresponding to the identification information of the retailer member system is extracted from the database and the extracted information is provided to the retailer member system.

8. The network server according to claim 1, wherein, when requested by the retailer member system, an order history of the customer is generated based on the order information and the customer information, and the generated order history is provided to the retailer member system as the order information or the customer information.

9. A network order system comprising:
order entry channels, each of which receives an order placed by a customer and each of which sends order information and customer information of the order;
retailer member systems, each of which mediates the order based on the order information and the customer information sent from an order entry channel;
a network server configured to receive and manage information comprising at least the order information of the order mediated by a retailer member system, said network server having a database; and
a communication network for connecting the order entry channels, the retailer member systems and the network server,
wherein the network server stores in the database the order information received from a order entry channel via a retailer member system, or the received order information and the received customer information along with identification information of the retailer member system that has mediated the order; and
based on the identification information of the retailer member system and in response to a request from the retailer member system, the network server extracts from the database at least one of the order information corresponding to the identification information of the retailer member system having made the request stored in the database, the customer information corresponding to the identification information of the retailer member system having made the request, and information generated based on at least one of the order information and the customer information, and provides the extracted at least one information to the retailer member system.

10. The network order system according to claim 9, wherein,
the retailer member systems include first retailer member systems, each sending to the network server both of the order information and the customer information sent from the order entry channel, and a second retailer member system for sending to the network server only the order information out of the order information and the customer information sent from the order entry channel and holding the customer information, and
in response to a request from the first retailer member system, the network server extracts from the database at least one of the order information stored in the database, the customer information corresponding to the identification information of the first retailer member system having made the request, and information obtained based on at least one of the order information and the customer information, and provides the extracted at least one information to the first retailer member system; and
in response to a request from the second retailer member system, the network server extracts from the database at least one of the order information stored in the database and information obtained based on the order information, and provides the extracted at least one information to the second retailer member system.

11. The network order system according to claim 10, wherein, the second retailer member system checks conformity between the order information provided from the network server in response to the request and the customer information held in the second retailer member system.

12. The network order system according to claim 9, wherein, when requested by the retailer member system, the network server generates the information obtained based on at least one of the order information and the customer information, and provides the generated information to the retailer member system.

13. The network order system according to claim 9, wherein
the network server generates the information obtained based on at least one of the order information and the customer information in advance, and provides the information generated in advance to the retailer member system when requested by the retailer member system.

14. The network order system according to claim 9, further comprising at least one lab system for creating a product corresponding to the order information and being connected to the network server, and the order entry channel receives an order of the product including at least one of a photograph print based on image data, an album based on the image data, a commodity on which an image of the image data is printed, and a recording medium on which the image data is recorded.

15. The network order system according to claim 9, wherein, the network server further includes a storage unit for storing uploaded image data of the customer, and the order received through the order entry channel is an order related to the storing of the image data of the customer in the storage unit.

16. The network order system according to claim 9, wherein the retailer member system offers to public via the communication network a web screen as a reception window for an order to be placed through the order entry channel.

17. The network order system according to claim 9, wherein, when requested by the first retailer member system, the network server extracts from the database the order information and the customer information corresponding to the identification information of the first retailer member system to provide the extracted order information and the extracted customer information to the first retailer member system having made the request, and,
when requested by the second retailer member system, the network server extracts from the database the order information corresponding to the identification information of the second retailer member system to provide the extracted order information to the second retailer member system having made the request.

* * * * *